Figure 1:
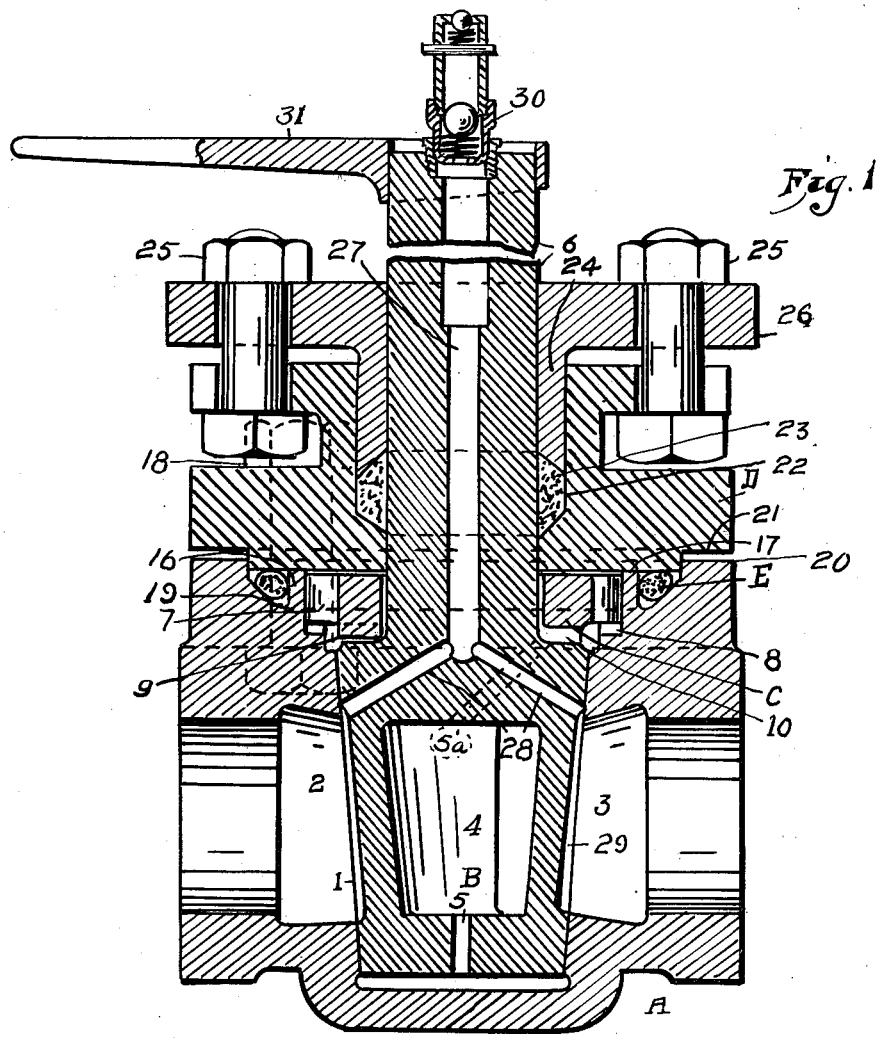

Oct. 18, 1927.  
W. TRINKS  
1,645,631  
ROTARY VALVE  
Filed July 3, 1922　2 Sheets-Sheet 2
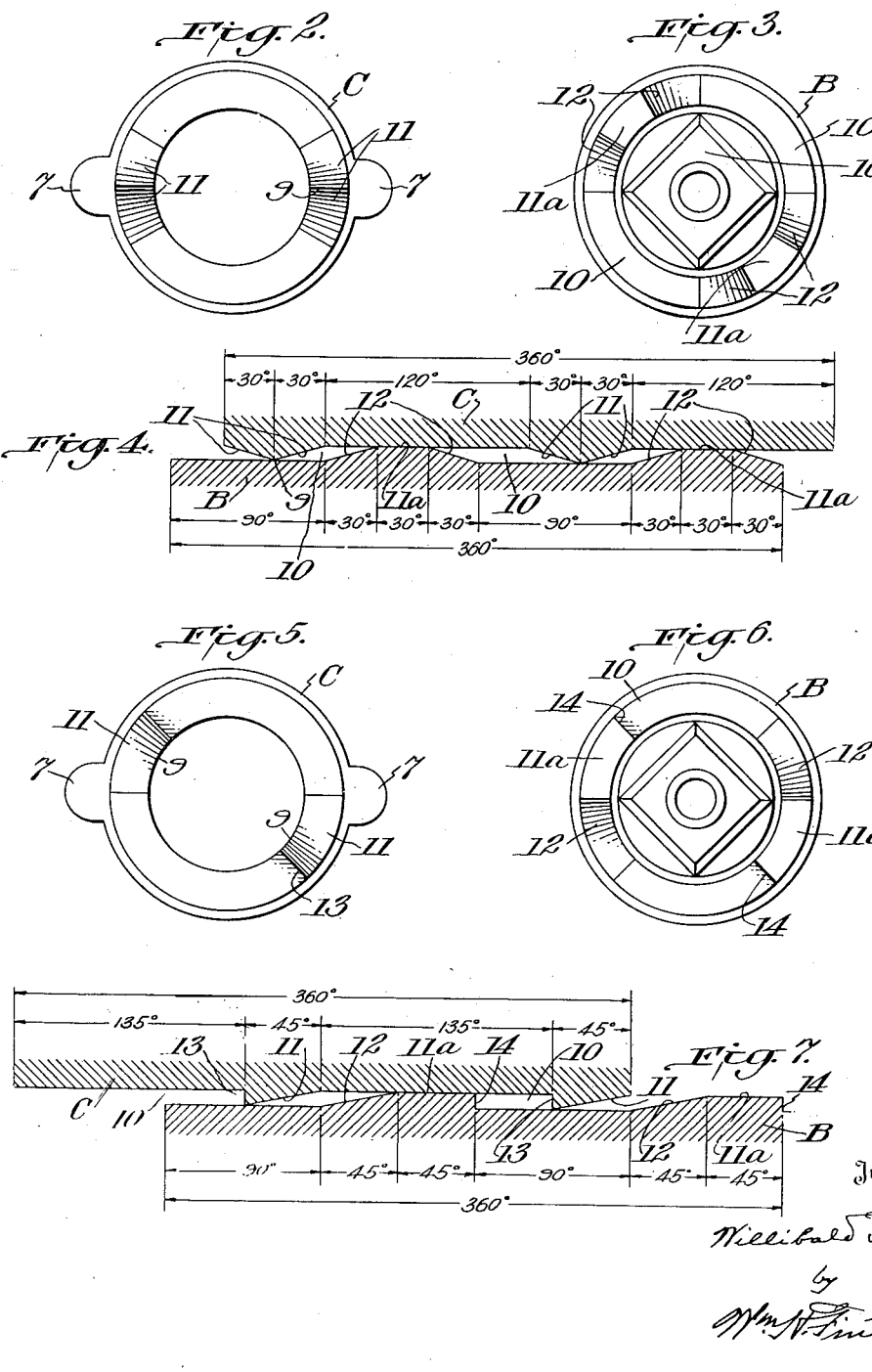

Patented Oct. 18, 1927.

1,645,631

UNITED STATES PATENT OFFICE.

WILLIBALD TRINKS, OF PITTSBURGH, PENNSYLVANIA, ASSIGNOR TO HOMESTEAD VALVE MANUFACTURING COMPANY, OF HOMESTEAD, PENNSYLVANIA, A CORPORATION OF PENNSYLVANIA.

ROTARY VALVE.

Application filed July 3, 1922. Serial No. 572,545.

My invention consists in certain new and useful improvements in rotary plug valves.

The design and construction of valves of this type, especially in the larger sizes, is notoriously difficult, since, if the plug is too tight in its seat the valve tends to stick and resists opening and closing, and if the plug is too loose there is a tendency to leak and also to wash away the lubricant necessary to the proper operation of the valve.

It is also known that to avoid both of these difficulties, and thus insure satisfactory operation of the valve, the plug should at all times fit snugly in its seat but without binding and without substantial longitudinal movement or play.

The present invention is an improvement upon the valve built under the patent granted W. F. Harrison, No. 579,432, March 23, 1897 and removes difficulties which existed up to the introduction of the present invention. The invention is two fold and refers partly to the packing between the cam and the cap, and partly to the shape of the cam on top of the plug.

If in the Harrison valve soft packing is interposed between the cap and the valve body, the result is unsatisfactory, as too thick a packing permits the plug to move longitudinally in its seat, and thus leakage and loss of lubricant occur. On the other hand, too thin packing requires so much compression to form a tight joint that the plug is forced too tightly into its seat.

In the smaller sizes of valves, which may be made of ductile metal, such as brass or bronze, in the past the packing has been formed by a knife edge bearing between the valve body and the cap, but this character of packed joint is not suitable for the larger sizes of valves, which are frequently of cast iron so that a knife edge or line contact bearing rapidly wears away or crumbles.

The first object which I have in view is the provision of a rotary plug valve, especially adapted to sizes and material in which the knife edge packing is impractical, wherein the joint between the valve body and the cap is provided with a surface contact, as distinguished from a line contact, of metal to metal, thus obtaining a bearing which will not wear or crumble into inefficiency. This metal to metal contact joint is rendered fluid-tight by the provision of a soft packing which is compressed by the clamping together of the two metal planes without however being interposed between the same or affecting the snugness of their mating; the variation of the size of the diameter of the packing cord or member within reasonable limits having no effect on the metal to metal fit.

Between the upper or outer end of the valve plug and the inner surface of the cap I interpose a non-rotating bearing ring, which holds the plug in place but which, however, does not have the continuous cam action so characteristic of the prior art and which permitted considerable longitudinal movement of the plug, unless such movement was prevented by other means. On the contrary my bearing ring allows no material longitudinal movement of the plug, such movement in fact being so slight that the molecular or capillary adhesion between the plug, lubricant and walls of the valve body is not disturbed. However, sufficient clearance must, of course, be provided to allow for heat expansion due to temperature differences between the plug and the valve body. For this purpose a clearance of 2/1000 of an inch is usually sufficient; varying somewhat of course with the size of the valve.

Flat radial contact surfaces at right angles to the axis of the plug are provided on the bearing ring and on the plug, of sufficient area to reduce the bearing pressure produced by unbalanced forces when the plug is in angular positions between its locking positions, sufficiently to insure, in conjunction with the lubricating feature, that wear of these contact surfaces due to turning the plug will be practically avoided, and that the axial clearance between the plug and the bearing will thereby be maintained constant.

The abutting surfaces of the plug and the bearing ring are provided with coacting portions which limit the rotary movements of the plug in opening and closing as in a one-way valve, or in a multiple way valve in turning into its various positions relative to the valve ports. These coacting portions may also be arranged to lock the valve in any or all of the positions which it is designated to assume.

Because of the plug being free from substantial longitudinal movement, I find no difficulty in maintaining proper lubrication, as there is no opportunity for the lubricant to be washed away while the valve is open, and of course there is no such opportunity when the valve is closed as then the coacting locking portions force the plug down into tight engagement with the walls of the valve seat. It is therefore unnecessary to utilize the bottom of the valve seat as a lubricant chamber or as a pressure chamber to loosen the plug when stuck. The presence of the lubricant and its uniform distribution over the walls of the valve seat prevent such sticking.

I provide means for supplying lubricant to the valve seat and distributing the same over the walls thereof.

Other novel features of construction and arrangements of parts will appear from the following description.

In the accompanying drawings, wherein is illustrated a one-way valve embodying the principles of my invention, Figure 1 is a vertical section of the valve showing the plug turned half way into its closed position; Fig. 2 is an inverted plan view of the bearing ring; Fig. 3 is a top plan view of the valve plug; Fig. 4 is a diagrammatic view showing the engagement of the bearing ring and the plug extended; Fig. 5 is an inverted plan view of a modified form of bearing ring; Fig. 6 is a top plan view of the valve plug adapted for use with the bearing ring shown in Fig. 5, and Fig. 7 is a view similar to Fig. 4 showing the engagement of the modified bearing ring and plug extended.

The following is a detailed description of the drawings, reference being first had to Figs. 1, 2, 3 and 4.

A is the valve casing, having a tapered valve seat 1 and, in the one-way valve illustrated, the diametrically opposed ports 2 and 3 intersecting the valve seat.

B is the valve plug tapered to fit snugly in the seat 1 and provided with a fluid-way 4, which is diametric in the case of the one-way valve shown and connects the ports 2 and 3 when the valve is open. I prefer to make the total included angle of the plug taper not less than 8° to prevent sticking.

5 is a port in the bottom of the plug and 5ª a port in the upper end of the same to properly balance the pressure.

C is the bearing ring which is slipped down over the plug stem 6 and fits on top of the plug proper. Said ring is held down on the plug by the cap D, and is prevented from rotation by its radial ears 7 which project into seats 8 cut in the wall of the valve seat.

The upper and lower faces of the bearing ring are planes normal to its axis, as is also the annular top surface of the valve plug surrounding the base of stem 6. Thus when the cap D is in position, the bearing ring C holds the plug B down snugly in its seat with but sufficient clearance to permit the plug to be properly rotated and to allow for expansion due to temperature differences.

The lower face of the bearing ring is provided with one or more, preferably a diametrically opposed pair of projections 9 for which clearance is provided by concentric recesses 10 in the upper end of the valve plug, such clearance being sufficient to permit the necessary rotary movement of the plug, as for instance a 90 degree rotation in the case of a one-way valve.

The projections 9 are formed by two opposed intersecting helical surfaces 11 and the ends of the recesses 10 are mating helical surfaces 12. When the plug has completed its movement in either direction, the corresponding surfaces 11 and 12 impinge and thus limit the movement of the plug, and said surfaces are also preferably arranged to interlock to hold the plug stationary. The angle of the helix may be somewhere about 15 degrees, because a small angle produces undue resistance to the inception of a reverse movement of the plug. 11ª are flat contact surfaces in a radial plane, which prevent axial motion of the plug while the latter is in angular positions between its locking positions. These surfaces, in contradistinction to prior art, are made large enough to prevent appreciable wear, which would increase the clearance and allow axial movement of the plug.

In Figs. 5, 6 and 7 I have shown the projections 9 of the bearing ring formed by one helical surface 11 and a vertical shoulder 13 while the recesses 10 of the plug terminate at one end in a helical surface 12 to mate with the surfaces 11 while the other ends of said recesses are formed by the vertical shoulders 14 to be engaged by the shoulders 13. This modified engagement between the bearing ring and the plug may be used successfully on one-way valves where the plug does not require locking in its open position; the engagement in such position being between the vertical shoulders 13 and 14. However in multiple-way valves, wherein the plug should be locked in positions of extreme movement, I prefer to provide for mating helical surfaces for each of such positions. Where the locking of the plug is not important the engagement at both ends of the recesses may be between vertical shoulders.

It is to be noted that there is no longitudinal movement of the valve plug, except such slight clearance as is necessary for expansion due to varying temperature; and the mating helical surfaces 11 and 12 act to take up any very slight movement due to such clearance and force the plug snugly into its seat. The expansion to be provided for is only a few thousandths of an inch so that this clearance is very slight.

The upper end of the body A is provided with an annular abutment 16 concentric with the axis of the valve seat and having its extended flat top surface 17 normal to said axis. Said surface 17 is in surface contact with the inner surface of the cap D when the latter is in position, said cap being tightened into position by means of the clamping bolts 18 which engage parallel flanges on the valve body and cap. It is thus evident that I provide an extended metal to metal surface contact between the valve body and the cap, a contact which is functionally very different from and superior to the line or knife edge contact of the old art above referred to.

Surrounding the abutment 16 I provide an annular packing groove or seat 19, preferably of downwardly contracting or triangular form, and in said groove is seated the annular soft packing cord E, preferably of round cross sectional shape, and of insufficient diameter to entirely fill the groove when compressed into place by the inner surface of the cap D. Thus, while the soft packing provides a fluid-tight joint between the valve body and the cap, the variations in the diameter of the packing, cause no variation of fit in the metal to metal contact between the valve body and the cap, but insure a fluid-tight joint.

I believe that a fluid-tight joint characterized by metal to metal surface contact with a soft packing is new in the valve art.

The packing groove 19 is surrounded by the annular shoulder 20 of greater height than the abutment 16, and for which clearance is provided by cutting away the edge of the cap D as at 21 so that the under portion of the cap fits down within the shoulder 20, and the cap is thus properly centered in relation to the valve stem, thereby preventing binding.

The bore of the cap D is enlarged downwardly to form the box 22 for the packing ring 23 surrounding the stem 6, and said packing ring is compressed by the gland 24 which is clamped into position by the bolts 25 connecting its flange 26 with the upper flange of the cap D.

The stem 6 is provided with an axial bore 27 which extends downwardly to connect with the inner ends of the pair of opposed passages 28 in the upper end of the valve plug, said passages inclining downwardly to connect at their outer ends with the vertically disposed grooves 29 cut in the face of the valve plug. The upper end of the bore 27 is enlarged and threaded to receive a lubricant cup 30 which may conveniently be a fitting for forced feeding of the lubricant to the grooves 29.

The upper end of the stem 6 may be squared to receive a socket handle 31 for opening and closing the valve.

It is evident that the engagement of the bearing ring with the end of the valve plug will prevent all longitudinal movement of the plug except such as is allowed for expansion and which is too slight to materially affect the fit of the plug in its seat. Thus the valve will not leak and the lubrication will be properly maintained. It is also evident that the plug may be locked in either its closed or open position, or both.

It is also evident that the metal to metal surface contact joint between the valve body and cap is properly packed to make a fluid-tight joint without forcing the plug down too tightly in its seat. It is further evident that the walls of the valve seat are efficiently lubricated so that the valve will not stick although fitting with proper snugness in the seat. It is also evident that the uniform and snug fit of the valve plug in the seat will prevent the lubricant being washed away, so that the proper and uniform lubrication may be maintained indefinitely, fresh lubricant being forced down into the distribution grooves as the supply wears away.

In the following claims, the words "lower" or "upper" refer to the position of the valve shown in Fig. 1. The valve is not, of course, limited to use in this position, but the latter is referred to for the sake of clearness.

Although, for the sake of clearness of illustration of the principles of my invention I have minutely described the embodiment of the same shown in the drawings, I do not wish to limit myself thereby but claim broadly:

1. In a rotary valve, the combination of a valve body provided with a tapered seat, a plug fitting in said seat and provided with a stem, a cap through which said stem protrudes and clamped to said body to hold the plug in place, and a bearing ring interposed between said cap and said plug, said bearing ring being provided with concentric portions projecting from its lower surface and said plug being provided with concentric recesses in its upper surface to furnish the necessary clearance for said projections to allow for the rotation of said plug, and the engagement of said projections with the ends of said recesses limiting the rotation of said plug and said bearing ring being also provided with flat parts on its lower surface, bearing at all times against corresponding flat parts on the upper surface of the plug and preventing vertical movement of the plug.

2. In a rotary valve, the combination of a valve body provided with a tapered seat, a plug fitting in said seat and provided with a stem, a cap through which said stem protrudes and clamped to said body to hold the plug in place, and a bearing ring interposed between said cap and said plug, said bearing ring being provided with concentric portions projecting from its lower surface and said plug being provided with concentric recesses to furnish the necessary clearance for said projections to allow for the rotation of said plug, the engagement of said projections with the ends of said recesses limiting the rotation of said plug, and said projections being provided with inclined surfaces and said recesses being provided with complementary inclined surfaces at their ends whereby said plug may be locked stationary, said bearing ring being also provided with flat parts on its lower surface, bearing at all times against corresponding flat parts on the upper surface of the plug and preventing vertical movement of the plug.

3. In a rotary valve, the combination of a valve body provided with a tapered seat, a plug fitting in said seat and provided with a stem, a cap through which said stem protrudes and clamped to said body to hold the plug in place, and a closely fitting bearing ring interposed between said cap and said plug, said bearing ring being provided with concentric portions projecting from its lower surface and said plug being provided with concentric recesses to furnish the necessary clearance for said projections to allow for the rotation of said plug, the engagement of said projections with the ends of said recesses limiting the rotation of said plug, and said projections being provided at one side with angular shoulders and at the other side with inclined surfaces, and said recesses being provided at one end with angular shoulders adapted to be engaged by the angular shoulders of said projections to limit the rotation of the plug in one direction while the other ends of said recesses are provided with inclined surfaces complementary to the inclined surfaces of said projections and adapted to mate with the same to limit the rotation of the plug in the other direction and lock said plug stationary, said bearing ring being also provided with flat parts on its lower surface, bearing at all times against corresponding flat parts on the upper surface of the plug and preventing vertical movement of the plug.

4. In a valve, the combination with a valve body provided with a tapered seat, of a plug complementary tapered and fitting said seat, a cap for said body, and a ring interposed between said cap and plug, said ring and said plug provided with complemental helical surfaces on their adjacent faces, the helical surfaces extending throughout a portion only of said adjacent faces and flat surfaces in a radial plane extending from the high points of the helical surfaces of the plug or ring being in contact with the remaining portions of the adjacent surfaces in a radial plane of the ring or plug respectively except when the helical surfaces themselves are in contact, whereby by the contact of the high points of the helical surfaces with said remaining portions of the adjacent faces, the plug is at all times held in intimate contact with its seat, and when the helical surfaces coact is forced tightly to its seat.

5. In a rotary valve, the combination of a valve body provided with a tapered seat, a plug fitting in said seat, a cap applied to said body, and a bearing ring interposed between said cap and said plug, said bearing ring being provided with cam-like portions projecting from its lower surface and said plug being provided with complemental recesses to furnish the necessary clearance for said projections to allow for the rotation of said plug, and the engagement of said projections with the ends of said recesses limiting the rotation of said plug, said bearing ring being also provided with flat parts on its lower surface, bearing at all times against corresponding flat parts on the upper surface of the plug and preventing vertical movement of the plug.

6. In a rotary valve, the combination of a valve body provided with a tapered seat, a plug fitting in said seat, a cap applied to said body, and a bearing ring interposed between said cap and said plug and provided with means to prevent its rotation, said ring having cam-like projections on its lower surface and the plug having complemental recesses in its adjacent surface, the surfaces of the cam-like projections coming into contact with the corresponding surfaces of the plug in positions of extreme movement of the plug, said bearing ring being also provided with flat parts on its lower surface, bearing at all times against corresponding flat parts on the upper surface of the plug and preventing vertical movement of the plug.

7. In a rotary valve, the combination of a valve body provided with a tapered seat, a plug fitting in said seat, a cap applied to said body, and a bearing ring interposed between said cap and said plug and provided with means to prevent its rotation, said ring having cam-like projections on its lower surface and the plug having complemental recesses in its adjacent surface, the surfaces of the camlike projections coming into contact with the corresponding surfaces of the plug in positions of extreme movement of the plug, said bearing ring being also provided with flat parts on its lower surface, bearing at all times against corresponding flat parts on the upper surface of the plug and preventing vertical movement of the plug, flat radial surfaces on the cam-like projections being in constant contact with similar surfaces on the plug to hold the plug tight in its seat at all times and these projections and the recesses cooperating.

8. In a valve consisting of a valve body with a tapered seat and a tapered plug fitting said seat, with a total taper angle not less than 8 degrees, the combination of short inclined surfaces, making angles of not less than 15 degrees with a radial plane, on the rotating plug and on a non-rotating element above the plug, said inclined surfaces defining projections on the non-rotating element and on the plug for limiting the rotary motion of the plug and for preventing axial motion of the plug, and means for leading lubricant to the outer surface of the plug.

9. In a valve consisting of a valve body with a tapered seat and a tapered plug fitting said seat, with a total taper angle of not less than 8 degrees, the combination of projections on the plug and projections on a non-rotating member above the plug arranged to limit both the radial motion and the axial motion of the plug, both the projections on the plug and those on the non-rotating element having short inclined surfaces making angles of not less than 15 degrees with a radial plane, and the projections on the plug ending in flat surfaces in a radial plane, said flat surfaces being of appreciable area and having a normal clearance from corresponding parallel flat surfaces in a radial plane on the opposing member, only sufficient to allow for unequal heat expansion of valve body and plug, and means for leading lubricant to the outer surfaces of the plug.

10. In a valve consisting of a valve body with a tapered seat and a tapered plug fitting said seat, with a total taper angle of not less than 8 degrees, the combination of projections on the plug and projections on a non-rotating member above the plug, both sets of projections having short inclined surfaces making angles of not less than 15 degrees with a radial plane, said surfaces being arranged to limit the rotary motion of the plug, and both sets of projections ending in flat surfaces in a radial plane, said flat surfaces being of appreciable area and having a normal clearance from parallel flat surfaces on the complementary member, only sufficient to allow for unequal heat expansion of valve body and plug, and arranged to limit the axial motion of the plug, and means for leading lubricant to the outer surface of the plug.

11. In a valve consisting of a valve body with a tapered seat and a tapered plug fitting said seat, with a total taper angle of not less than 8 degrees, the combination of projections on the plug and projections on a non-rotating element above the plug, both the projections on the plug and those on the non-rotating element having short inclined surfaces making angles of not less than 15 degrees with a radial plane, said surfaces arranged to limit the rotary motion of the plug, and the projections on the plug ending in flat surfaces in a radial plane, said flat surfaces being of appreciable area and having a normal clearance from parallel flat surfaces on the nonrotating element only sufficient to allow for unequal heat expansion of valve body and plug, and arranged to limit the axial motion of the plug, and means for leading lubricant to the outer surface of the plug.

Signed at Pittsburgh, Pa., this 14th day of June, 1922.

WILLIBALD TRINKS.